(12) United States Patent
Dopp et al.

(10) Patent No.: US 6,779,692 B2
(45) Date of Patent: Aug. 24, 2004

(54) APPARATUS AND METHOD FOR INCREASING DENSITY OF FINELY DIVIDED PARTICULATE MATTER

(75) Inventors: Steven Fred Dopp, Midland, MI (US); Susan Jane Gelderbloom, Midland, MI (US); Jary David Jensen, Midland, MI (US)

(73) Assignee: Dow Corning Corporation, Midland, MI (US)

(*) Notice: Subject to any disclaimer, the term of this patent is extended or adjusted under 35 U.S.C. 154(b) by 133 days.

(21) Appl. No.: 10/077,920

(22) Filed: Feb. 20, 2002

(65) Prior Publication Data

US 2003/0062389 A1 Apr. 3, 2003

Related U.S. Application Data

(60) Provisional application No. 60/326,004, filed on Oct. 1, 2001.

(51) Int. Cl.⁷ ................................................ B30B 3/00
(52) U.S. Cl. ..................... 222/413; 100/145; 100/147; 100/148; 406/60
(58) Field of Search ........................ 222/412, 413; 100/144, 145, 146, 148, 147; 406/60

(56) References Cited

U.S. PATENT DOCUMENTS

| | | | | |
|---|---|---|---|---|
| 647,354 A | * | 4/1900 | Anderson | 100/148 |
| 2,142,990 A | * | 1/1939 | Belcher | 141/44 |
| 2,299,470 A | * | 10/1942 | Davis | 406/60 |
| 2,355,774 A | * | 8/1944 | Baker | 406/60 |
| 2,374,363 A | * | 4/1945 | McCaskell | 222/63 |
| 2,903,960 A | * | 9/1959 | Zies | 100/148 |
| 2,946,357 A | | 7/1960 | Hobbie et al. | 141/5 |
| 2,954,883 A | | 10/1960 | Durant | 214/17 |
| 3,034,421 A | | 5/1962 | Pence | 100/43 |
| 3,341,280 A | * | 9/1967 | Eolkin | 422/31 |
| 3,588,180 A | * | 6/1971 | Herr | 406/60 |
| 3,646,689 A | * | 3/1972 | Kuchenthal et al. | 222/413 |
| 3,664,385 A | | 5/1972 | Carter | 141/12 |
| 3,756,434 A | * | 9/1973 | Teske | 222/413 |
| 4,003,304 A | * | 1/1977 | Reinhall | 100/148 |
| 4,904,285 A | | 2/1990 | Yamada et al. | 55/191 |
| 5,052,874 A | * | 10/1991 | Johanson | 100/147 |
| 5,302,102 A | * | 4/1994 | Haimer | 100/145 |
| 5,478,511 A | | 12/1995 | Foresman | 264/40.5 |

FOREIGN PATENT DOCUMENTS

| | | |
|---|---|---|
| FR | 2 370 578 | 6/1978 |
| GB | 2 034 591 | 6/1980 |

* cited by examiner

Primary Examiner—Kenneth Bomberg
(74) Attorney, Agent, or Firm—Catherine U. Brown (57) ABSTRACT

An apparatus for removing air from finely divided particulate material comprises a housing including a vent; an inlet to the housing; an outlet from the housing; a helix, rotatably mounted in the housing, the helix being adapted upon rotation to feed a particulate material from the inlet to the outlet; a motor mounted to the helix for the purpose of rotating the helix; and a compression assembly mounted to the outlet for compressing the particulate material passing through the outlet.

10 Claims, 8 Drawing Sheets

Figure 1

Figure 1:
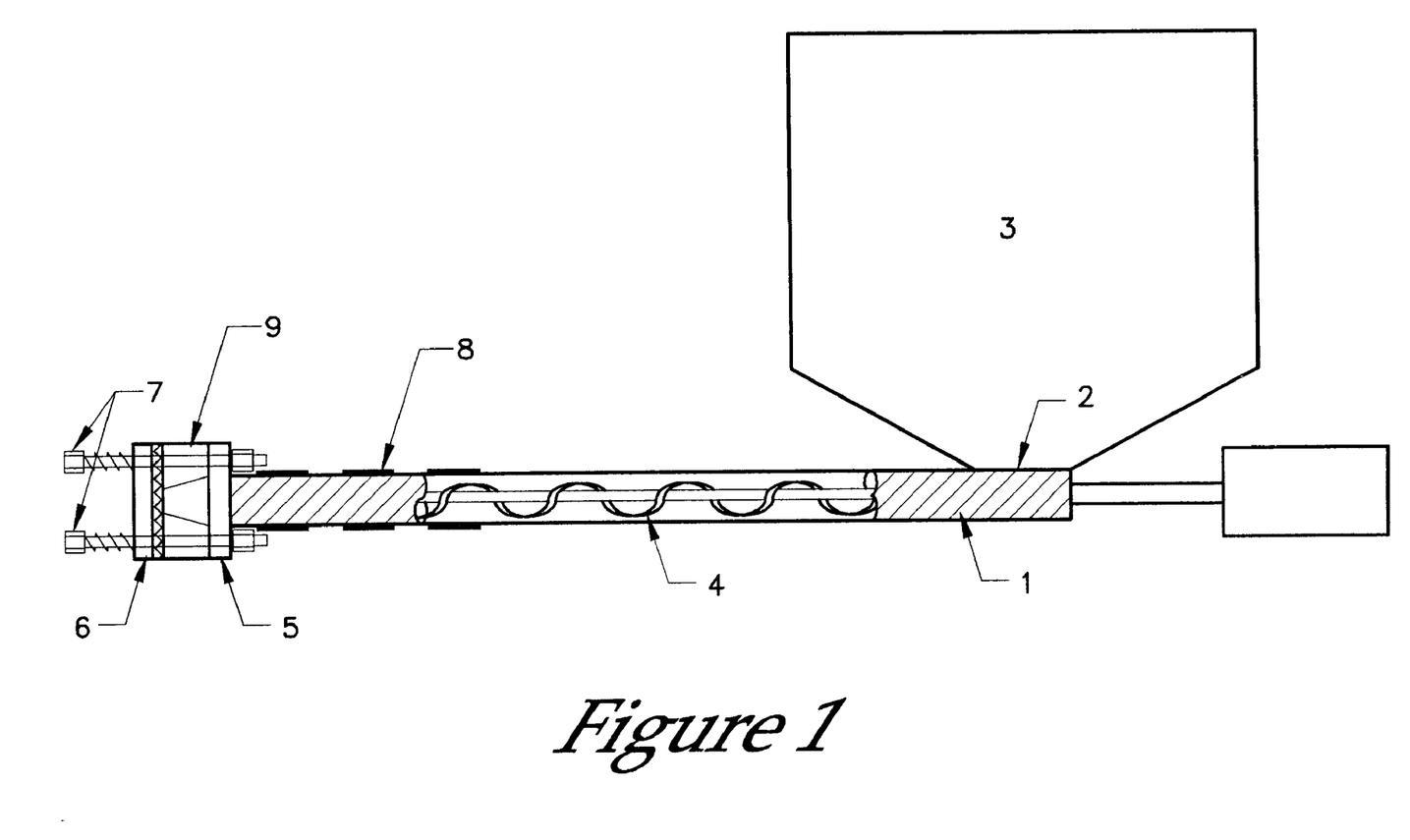
Figure 2:
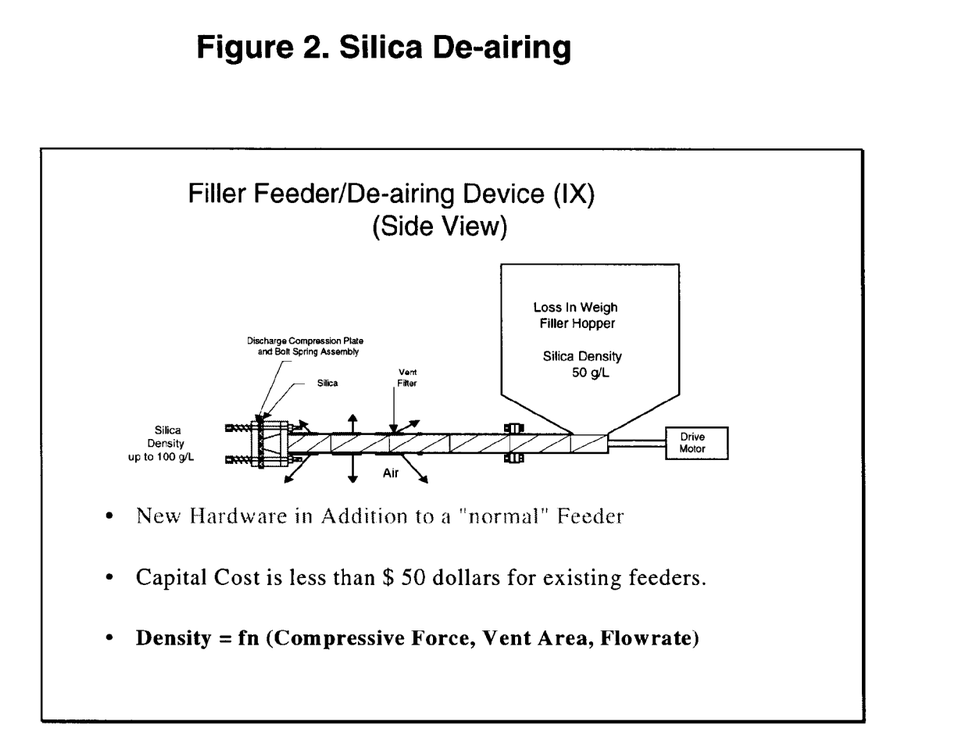

Figure 2. Silica De-airing

- New Hardware in Addition to a "normal" Feeder

- Capital Cost is less than $ 50 dollars for existing feeders.

- Density = fn (Compressive Force, Vent Area, Flowrate)

Figure 3:
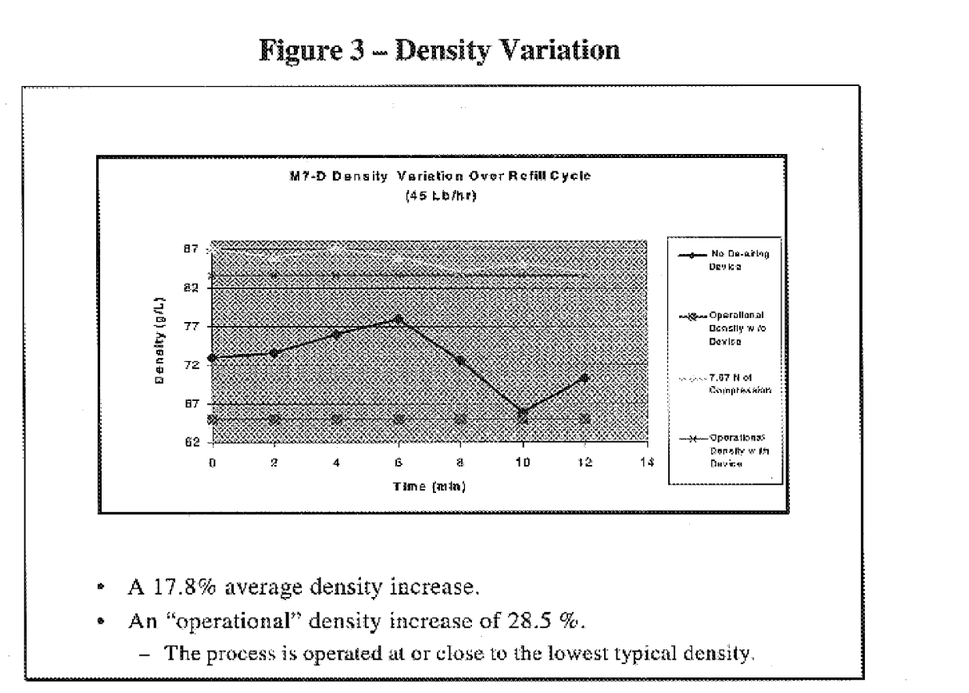

Figure 3 – Density Variation

- A 17.8% average density increase.
- An "operational" density increase of 28.5 %.
  - The process is operated at or close to the lowest typical density.

Figure 4:
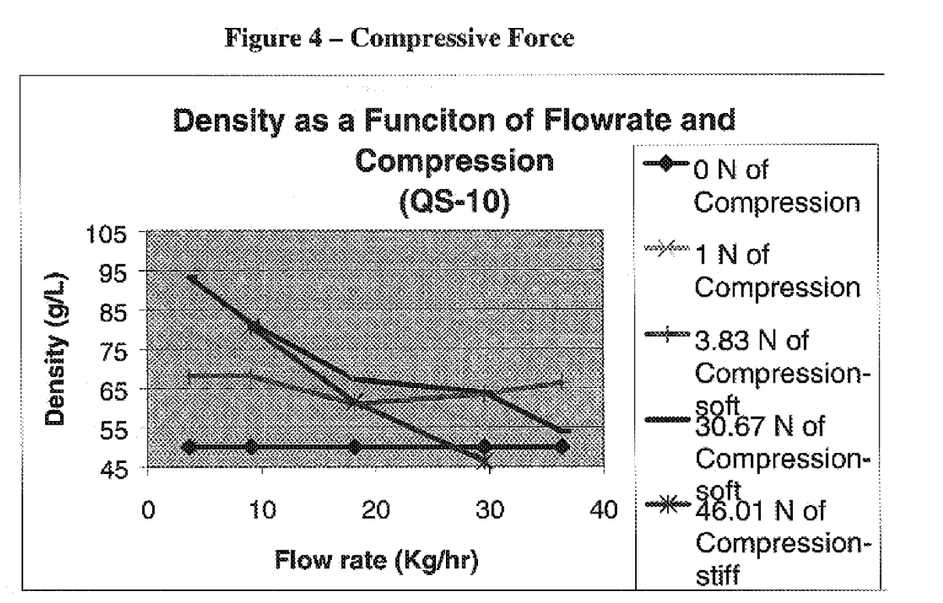

Figure 4 – Compressive Force

Figure 5:
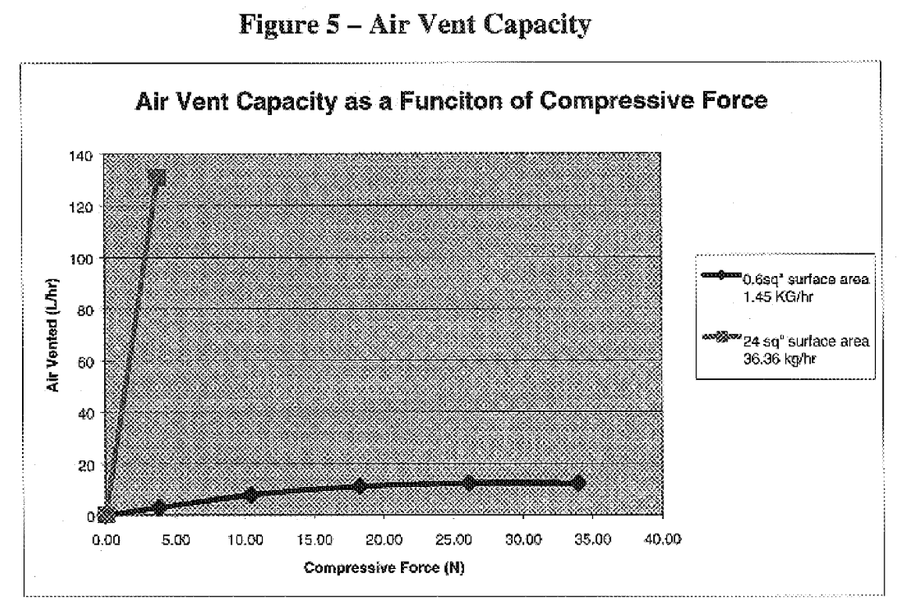

Figure 5 – Air Vent Capacity

Figure 6:
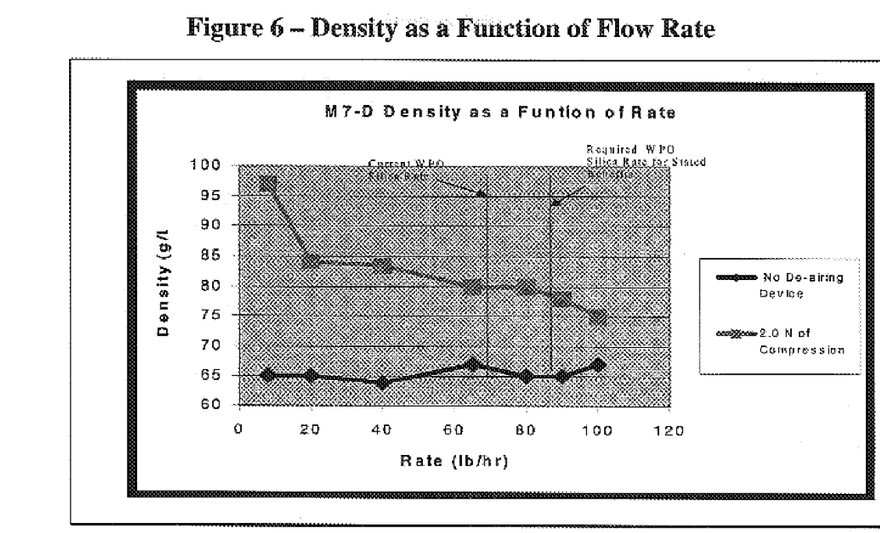
Figure 7:
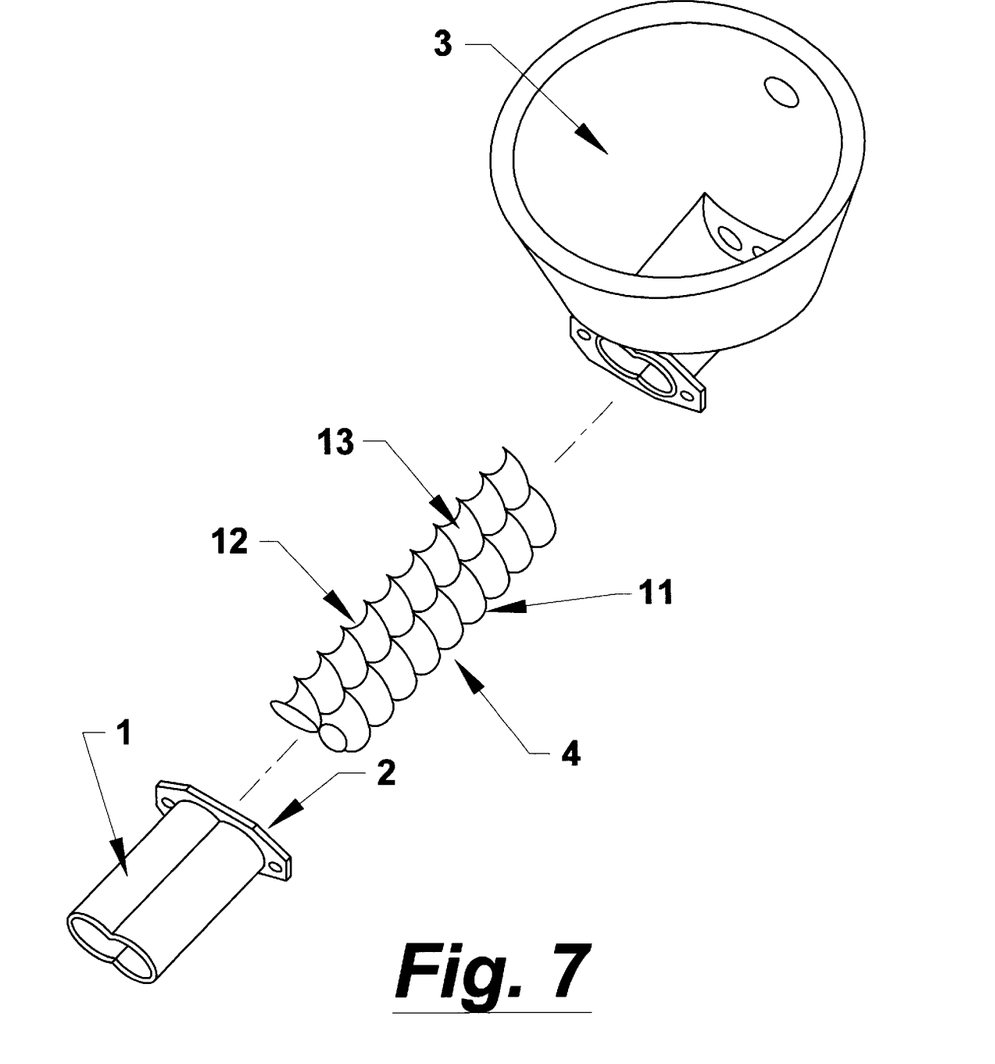
Figure 8:
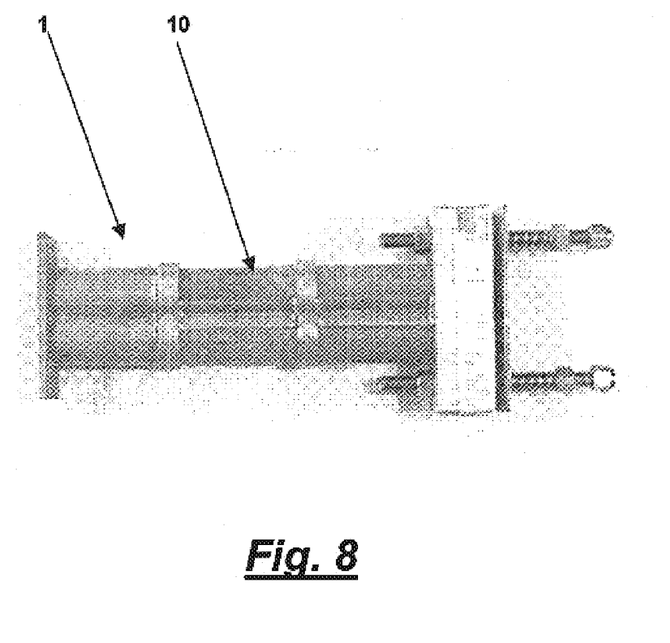

Figure 6 – Density as a Function of Flow Rate

Fig. 7

Fig. 8

APPARATUS AND METHOD FOR INCREASING DENSITY OF FINELY DIVIDED PARTICULATE MATTER

This invention claims priority from provisional application Serial No. 60/326,004 filed Oct. 1, 2001 under U.S.C. §119(e).

FIELD OF THE INVENTION

The present invention relates to equipment, commonly referred to as "feeders", for dispensing finely divided particulate materials that are flowable. In particular this invention relates to an apparatus and a method for removing interstitial air between the particles of finely divided particulate materials while they are being dispensed through a feeder.

BACKGROUND OF THE INVENTION

Many continuous processes that include adding finely divided particulate materials, such as silica, carbon black, and other fillers, are typically rate-limited by the volume addition of those materials. In part, this is because most finely divided particulate materials interstitial and entrained air, and have a large part of their volume represented by air. For this reason there have been attempts to remove the air by vacuum, and/or densify the finely divided particulate material by mechanical means such as shaking or compacting.

U.S. Pat. No. 3,664,385 to Carter teaches an apparatus and a method of compacting finely divided particulate material which uses a first rotating screw feeder for advancing the material along a housing having a tubular sleeve mounted within the housing. The sleeve and housing define a closed hollow chamber, extending about the sleeve with a plurality of perforations in the sleeve. Suction is applied chamber so that air can flow from the sleeve to the chamber. Intermittent air pressure is applied to the chamber to backflush particulate material from the perforations. The particulate material, which is densified in the first rotating screw, is then mechanically advanced along the second sleeve passage to a container filling station.

SUMMARY OF THE INVENTION

The present invention is a feeder that removes interstitial air from finely divided particulate materials by creating a compression force counter to the material feed direction, allowing pressure to build up while the finely divided particulate material is transported through a housing and then venting air from the housing.

BRIEF DESCRIPTION OF THE DRAWINGS

FIG. 1 shows an apparatus of the present invention having 1. a cylindrical housing
2. an inlet to the housing
3. a hopper that feeds finely divided particulate material to the inlet
4. a helix driven by a motor, the helix installed so that it can axially rotate within the cylindrical housing
5. an outlet
6. an end plate mounted perpendicularly to the outlet at a distance to allow finely divided particulate material to discharge from the outlet against the plate and radially from the axis of the cylindrical housing
7. compression screws holding pressure against the end plate 8. a vent located on the cylindrical housing, the vent providing fluid communication between the interior of the cylindrical housing and the exterior of the cylindrical housing by means of openings having a smaller diameter than the diameter of the particulate material,
9. a restrictor plate mounted to the outlet.

FIG. 2 shows an example of a silica de-airing process using the device of the present invention.

FIG. 3 shows the reduced density variation and the density increase of silica using the device of the present invention.

FIG. 4 shows density as a function of flow rate and compression.

FIG. 5 shows air vented as a function of compressive force for two vent sizes.

FIG. 6 shows silica density as a function of flow rate through a device of the present invention.

FIG. 7 shows a cutaway perspective view of a portion of an apparatus of the present invention having 1. a housing
2. an inlet to the housing
3. a hopper that feeds finely divided particulate material to the inlet
4. a helix, the helix installed so that it can axially rotate within the housing, where the helix comprises 11. a first threaded screw inside the housing, and
12. a second threaded screw inside the housing, wherein the first threaded screw has threads offset from and intermeshed with the threads of the second threaded screw and where the first threaded screw and the second threaded screw have
13. concave threads.

FIG. 8 shows a photograph of a portion of the housing 1 of the apparatus in FIG. 7. The housing 1, has a sintered metal vent 10.

DETAILED DESCRIPTION OF THE INVENTION

The feeder of the present invention is suitable for removing interstitial air from a variety of finely divided particulate materials, such as fluffy powders or mineral fillers used in the rubber and coating industry. In the present invention, finely divided particulate material enters a cylindrical housing (1) at an inlet (2) located near one end of the cylindrical housing. In a preferred embodiment, the finely divided particulate material is fed into the inlet (2) from a hopper (3), and a weighing device on the hopper, or a flow meter placed between the hopper and the inlet, measures the flow rate of the finely divided particulate material as it moves through the inlet (2). The use of a weighing device or flow meter allows for the feeder to be used in a continuous process where an amount of finely divided particulate material needs to be delivered at a constant or known rate.

The finely divided particulate material is conveyed along the length of the cylindrical housing (1) by a helix (4) within the housing that is driven by a motor to rotate coaxially to the cylindrical housing. The helix can be a coil or a screw with threads. When a coil is used to advance the material, it is often called a pigtail. When a screw with threads is used, the threads of the screw can be either convex (as an auger) or concave in shape. Some feeders use a single screw. Other feeders use two screws, with the helix of the first screw offset so as to intermesh with the helix of the second screw. This type of feeder is called a "twin-screw". The screws of the twin-screw extruder can rotate in the same direction (co-rotate), or in opposite directions (counter-rotate). For the feeder of this invention, a co-rotating twin screws with concave threads are preferred. When a twin-screw feeder is used, the finely divided particulate material is turned over more times, exposing more surface and interstitial air to the pressure differential. The concave threads are preferred because the finely divided particulate material is pushed with at force more normal to the walls of the cylindrical housing than would be typical for convex or auger designs. The size of the feeder, the size of the screw, and the power to drive the rotation of the screws are dependent on the material to be dispensed, as well as the speed with which dispensing is required.

The feeder of this invention uses compression force on the feeder to generate pressure to force interstitial air out of the finely divided particulate material. The compression force is created as the finely divided particulate material is conveyed along the helix (4) within the cylindrical housing (1), and is discharged through an outlet (5) against an end plate (6) held in place against the flow of the finely divided particulate material with a compression screw (7).

The compression force generates a differential pressure between the inside of the feeder housing and the pressure outside the feeder, usually atmospheric pressure. The pressure forces the interstitial air through a vent (8), removing it from the finely divided particulate material. This increases the density of the finely divided particulate material. Without being tied to any one theory, the inventors believe that an increase in density is a function of the compressive force, the vent area, and the flow rate of the finely divided particulate material through the feeder. The compressive force should be optimized. Excessive compressive force leads to plugging, potential silica damage, and feeder instability due to inadequate pumping capacity. Too little force creates inadequate differential pressure. Maximizing the vent area allows lower compressive force and maximizes the vent capacity. Higher flow rates result in less density improvement because of the increased air volume. To get higher rates, the feeder screws rotate faster, resulting in less residence time in the event area, and therefore less air can be vented. To achieve the maximum benefit, feeders with larger diameter screws are required. Larger diameter screws would be used to increase the volume per revolution of filler, resulting in lower screw speeds, and more residence time in the vent area.

In a preferred embodiment, the outlet (5) is located between the housing (1) and the plate (6), so that the finely divided particulate material exits radially to the axis of the helix. The direction of the flow of the finely divided particulate material after it has traveled through the outlet can then be directed by any conventional means.

The plate (6) is held in place by one or more compression springs. The compression spring can be adjusted to adjust the pressure against the flow of the finely divided particulate material. The springs allow the plate to move slightly as the force against the plate increases. The use of springs reduces or prevents seizing of the feeder from over-compression of the finely divided particulate material. Other means for providing compression on the plate that are suitable for this invention include cams, elastic bands, cantilevered weights and the like. Preferably, between the outlet (5) and the end plate (6) is a restrictor plate (9). The restrictor plate directs the flow of the finely divided particulate material from the chamber with the helix, reducing the cross-sectional area of the flow as the finely-divided particulate material from the cylindrical housing, through a tapered surface, such as a partial cone, toward the center of the plate (6). The tapered surface distributes pressure to the center of the plate, creating an isotropic pressure gradient over the face of the plate. The angle of the tapered surface, from the inside diameter of the cylindrical housing (1) to the plate (6) can be from about 5° (nearly parallel to the axis of the cylindrical housing) to about 85° (nearly perpendicular to the axis of the cylindrical housing). If an insufficient taper used, the finely divided particulate material tends to compact. If the taper is too narrow (i.e. too close to 90°) there will be too much compression force directed back to the outlet, causing compacting at the outlet. Preferably, the tapered surface is a right centered cone, with the tapered surface at an angle of between 5° and 60° and more preferably between about 30° and 45° from parallel to the axis. The exact angle that is useful for each machine will be determined by simple experimentation.

In the feeder of the present invention, the housing is fitted with a vent (8). The vent allows air to escape the feeder while retaining the finely divided particulate material in the feeder. In one embodiment, a conventional vent with a filter is attached to the feeder housing perpendicular to the axis of the screw. In a preferred embodiment, the vent is constructed by using sintered metal as the housing material for a section of the housing. By using a sintered metal housing, there is less buildup of finely divided particulate material at the vent surface. Air transport through some particulate materials, such as silica or mica, can be quite slow. The area of venting will be determined by the desired flow rate and compression of the material.

To maximize the removal of interstitial air, the flow rate of the finely divided particulate material should be optimized to maximize residence time and exposure to the pressure differential, while maintaining an acceptable flow rate for the process that the feeder is supplying. Too high of a flow rate requires faster feeder screw speeds, resulting in less residence time for venting.

While the feeder of the present invention is designed to use compressive force to push interstitial air out of the finely divided particulate material through a vent, it is possible to use vacuum to assist the airflow. In an embodiment using vacuum in addition to compressive force, a second housing would be fitted around the cylindrical housing. On the second housing would be a vacuum port through which air would be removed from the space defined between the cylindrical housing and the first housing. Another advantage of having a second housing surrounding the cylindrical housing is that it would allow the filtering surface to be easily cleaned through a pulse back of air through the sintered metal.

EXAMPLES

Example 1

A device of the present invention was constructed to remove air from silica having bulk densities ranging from 35 to 70 g per liter. This design a maximum of 5N of compressive force on an area of approximately 0.002 m$^2$ (3.53 in$^2$) creating about 2.5 kPa (0.4 psi) of discharge pressure. A vent area of about 0.015 m$^2$ (24 in$^2$) results in adequate venting capacity to effectively increase the silica density at rates up to 45.5 kg/hr (100 lb/hr). The resulting silica bulk density was about 100 g/L. The silica in this example was discharged to a silicone compounder for making a curable silicone composition.

The device of Example 1 increases the silica density and reduces density variation. As shown in FIG. 3, the average density increased by 17.8% and the operational density increased by 28.5% over a feeder refill cycle. The operational density is the density the compounding process would have to operate at to prevent overfilling (Flooding) the compounder. Compounder flooding leads to waste and/or poor product quality because the process is shutdown or the material is produced with varying levels of silica.

Compressive Force

The effect of compressive force on the compression screws of the device on density was measured. This data is from the device configuration of example 1 Optimum compressive force for the design if example 1 is approximately 5N. FIG. 4 shows the impact of excessive and insufficient compressive force.

Vent Area

FIG. 5 shows that maximizing the vent area allows lower compressive force and maximizes the vent capacity.

Flow Rate

The effect of flow rate of M7-D silica through the device of EXAMPLE 1 on the resulting density was measured. The results can be seen in FIG. 6.

We claim:

1. A method comprising:
   a. mechanically advancing a particulate material having interstitial air between the particles through an apparatus comprising:
      A. a housing including a vent;
      B. an inlet to the housing;
      C. an outlet from the housing;
      D. a helix, rotatably mounted in the housing, the helix being adapted upon rotation to feed a particulate material from the inlet to the outlet;
      E. a motor mounted to the helix for the purpose of rotating the helix; and
      F. a compression assembly mounted to the outlet for compressing the particulate material passing through the outlet, wherein the compression assembly comprises
         i. an end plate mounted to the outlet at a distance from the outlet to permit discharge of the particulate material while applying a restriction to the outlet such that pressure increases in the housing to a level above the pressure outside the housing,
         ii. a compression means mounted to the end plate for pushing the end plate towards the outlet, and
         iii. a restrictor plate between the outlet and the end plate, wherein the restrictor plate has an opening, and wherein the restrictor plate is mounted to the outlet normal to the discharge flow of the particulate material from the outlet;
   where the particulate material is mechanically advanced from the inlet of the housing to the outlet of the housing, wherein the housing has an internal pressure,
   b. applying pressure to the outlet, wherein the pressure is sufficient to raise the internal pressure above pressure external to the housing, and
   c. allowing the interstitial air to escape through the vent.

2. An apparatus comprising:
   a. a housing including a vent;
   b. an inlet to the housing;
   c. an outlet from the housing;
   d. a helix, rotatably mounted in the housing, the helix being adapted upon rotation to feed a particulate material from the inlet to the outlet;
   e. a motor mounted to the helix for the purpose of rotating the helix; and
   f. a compression assembly mounted to the outlet for compressing the particulate material passing through the outlet, wherein the compression assembly comprises
      i. an end plate mounted to the outlet at a distance from the outlet to permit discharge of the particulate material while applying a restriction to the outlet such that pressure increases in the housing to a level above the pressure outside the housing,
      ii. a compression means mounted to the endplate for pushing the end plate towards the outlet, and
      iii. a restrictor plate between the outlet and the end plate, wherein the restrictor plate has an opening, and wherein the restrictor plate is mounted to the outlet normal to the discharge flow of the particulate material from the outlet.

3. The apparatus of claim 2, wherein the compression means comprises a compression screw.

4. The apparatus of claim 2, wherein the compression means comprises a piston.

5. The apparatus of claim 2, wherein the compression means comprises a bolt spring.

6. The apparatus of claim 2, wherein the opening has a non-uniform cross-sectional area, wherein the cross-sectional area is larger at the outlet than at the end plate.

7. The apparatus of claim 6, wherein the opening defines a cross section of a cone, having surfaces that taper from at least about 5 degrees from the outlet to the end plate.

8. The apparatus of claim 6, wherein the opening defines a cross-section of a cone, having surfaces that taper from up to about 85 degrees from the outlet to the end plate.

9. The apparatus of claim 2, wherein the helix comprises a threaded screw.

10. The apparatus of claim 2 where the vent comprises a plurality of openings in the housing, wherein the openings having sizes smaller than the size of the particulate material.

* * * * *